J. M. A. BERGER.
VERMIN TRAP.
No. 190,732.                  Patented May 15, 1877.
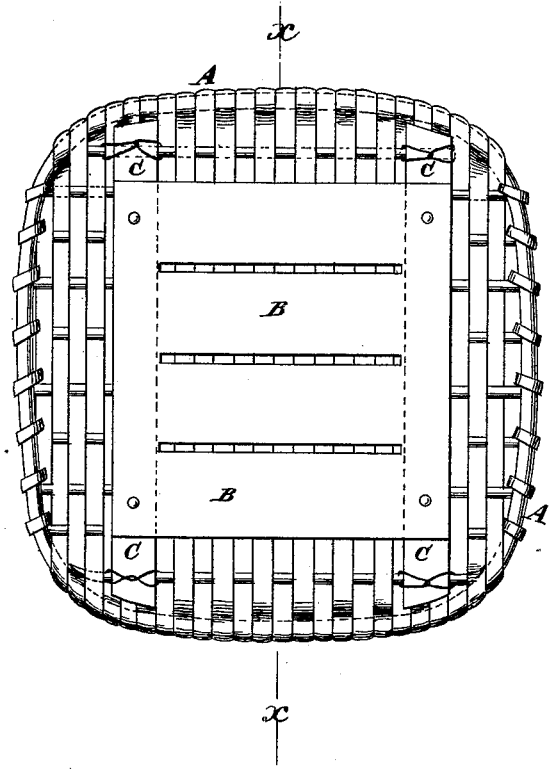
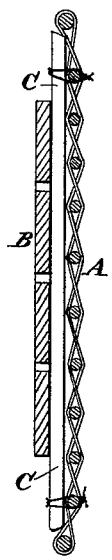
WITNESSES:
INVENTOR:
J. M. A. Berger.
BY
ATTORNEYS.

UNITED STATES PATENT OFFICE.

JEAN M. A. BERGER, OF CHARLESTON, SOUTH CAROLINA.

IMPROVEMENT IN VERMIN-TRAPS.

Specification forming part of Letters Patent No. 190,732, dated May 15, 1877; application filed March 19, 1877.

*To all whom it may concern:*

Be it known that I, J. M. AUGUSTE BERGER, of Charleston, in the county of Charleston and State of South Carolina, have invented a new and Improved Vermin-Trap, of which the following is a specification:

In the accompanying drawing, Figure 1 represents a top view, and Fig. 2 a vertical transverse section on line $x\,x$, Fig. 1, of my improved bed-trap.

Similar letters of reference indicate corresponding parts.

The invention relates to an improved trap for catching bed-bugs, cockroaches, and other vermin, the trap being cheap, clean, simple, and durable, and dispensing with the various insect-destroying compounds, and the time and labor lost in hunting them.

The invention consists of a frame or base of willow-ware, provided with boards having proper interstices attached to cross-strips in close proximity to the willow frame.

In the drawing, A represents the main frame or base part of my improved vermin-trap, which frame is made of split willow or of soft split wood or other equivalent material, that is wound alternately around cross-strips in the nature of willow-ware.

The base-frame A may be made of square, oval, or oblong shape, and used as a trap without any additional feature; but for greater efficacy it is provided with thin face-boards B of corresponding shape, that are attached to supporting cross-strips C in close proximity to the frame. The cross-strips C are secured, by wire or otherwise, to the willow frame, and small interstices $a$ arranged between the boards for the passage of the insects to the darker cavities and arched spaces formed by the willow frame and boards.

The trap is placed in position either at the head or foot end of the bed, or between the mattress and slats, or between bedstead and bedding, or at any other place where the insects are apt to congregate. The bugs, roaches, or other vermin are attracted by the large number of recesses and cavities of the trap, and are fond of hiding in the same.

In the morning the trap is taken out and the insects shaken out of the same, on the floor or into a tub with water, by knocking the trap against the floor or other body. The traps will be still more efficacious, especially for young roaches and insects, by sprinkling the same slightly with water before placing them in position. The trap is quickly set into its place or removed, readily shaken, and the insects then destroyed. By proper handling it may last for years, forming a clean, simple, and convenient trap for domestic use.

Having thus described my invention, I claim as new and desire to secure by Letters Patent—

A vermin-trap formed of a willow-ware frame and face-boards, attached to cross-strips in close proximity to the frame, and having suitable interstices between each other, substantially as specified.

JEAN MARIE AUGUSTE BERGER.

Witnesses:
OTTO H. WILSON,
H. W. TILTON, Jr.